United States Patent
Rockway et al.

(10) Patent No.: US 8,285,217 B1
(45) Date of Patent: Oct. 9, 2012

(54) CIRCULATOR-ENABLED SIGNAL SUPPRESSOR (CENSOR) FOR REDUCING CO-SITE TRANSMISSION INTERFERENCE

(75) Inventors: John W. Rockway, San Diego, CA (US); Karl Moeller, San Diego, CA (US); Jeffrey L. Young, Moscow, ID (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 423 days.

(21) Appl. No.: 12/706,100

(22) Filed: Feb. 16, 2010

(51) Int. Cl.
- *H04B 1/00* (2006.01)
- *H04B 15/00* (2006.01)
- *H04B 1/46* (2006.01)
- *H04B 7/00* (2006.01)

(52) U.S. Cl. ..... 455/63.1; 455/63.4; 455/83; 455/278.1; 455/296

(58) Field of Classification Search .......... 455/63.1, 455/269–278.1, 283–286, 295–296, 63.4, 455/83, 295–296, 562.1, 575.7
See application file for complete search history.

(56) References Cited

U.S. PATENT DOCUMENTS

| | | | | |
|---|---|---|---|---|
| 5,444,864 A * | 8/1995 | Smith | | 455/84 |
| 6,067,448 A | 5/2000 | Ho et al. | | |
| 6,374,094 B1 * | 4/2002 | Zappala | | 455/188.1 |
| 6,507,728 B1 | 1/2003 | Watanabe et al. | | |
| 7,092,684 B2 | 8/2006 | Szopko et al. | | |
| 7,719,384 B1 * | 5/2010 | Arceo et al. | | 333/132 |
| 7,733,814 B1 * | 6/2010 | Rausch et al. | | 370/280 |
| 7,816,995 B1 * | 10/2010 | Allen et al. | | 333/1.1 |
| 7,983,627 B2 * | 7/2011 | Adler et al. | | 455/83 |
| 2005/0207509 A1 * | 9/2005 | Saunders et al. | | 375/285 |
| 2006/0040620 A1 * | 2/2006 | Jung et al. | | 455/82 |
| 2007/0230547 A1 * | 10/2007 | Asai et al. | | 375/219 |
| 2007/0291171 A1 * | 12/2007 | Neal | | 348/487 |

OTHER PUBLICATIONS

Dongeun Kim, Jongwoo Kim, Suwon PARK1, Seung Hyong Rhee, Chul-Ho Kang, Kiyoung Han, and Hyongoo Kang; Circulator-based Interference Reduction Method for WiMAX System and Wi-Fi System in Shared Band; 978-1-4244-4216-4/09/IEEE; ICUFN 2009.

* cited by examiner

*Primary Examiner* — Simon Nguyen
(74) *Attorney, Agent, or Firm* — Kyle Eppele; J. Eric Anderson (57) ABSTRACT

A circulator-enabled signals suppressor (CENSOR) for reducing co-site interference comprising: a first circulator comprising first, second, and third ports, wherein the first port is disposed to receive an incoming signal from an antenna, wherein the incoming signal comprises a desired signal and an interference signal; a first reflective, tunable bandpass filter-bank operatively coupled to the second port, disposed to reflect a reflected signal back into the second port and also to produce a filtered signal, wherein the reflected signal comprises the desired signal and a reflected portion of the interference signal, and the filtered signal comprises a majority portion of the interference signal; and a receiver operatively coupled to the third port and disposed to receive the reflected signal.

17 Claims, 8 Drawing Sheets

CIRCULATOR-ENABLED SIGNAL SUPPRESSOR (CENSOR) FOR REDUCING CO-SITE TRANSMISSION INTERFERENCE

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil. Reference Navy Case Number 100008.

BACKGROUND OF THE INVENTION

This invention relates generally to methods and systems for reducing co-site interference between a radio transmitter located in close proximity to a broadband radio receiver. The ability of receivers to monitor the receive spectrum is severely degraded by interference signals from co-sited transmitters. This degradation can be due to desensitization, inter-modulation, and/or other nonlinear effects. There exists a need for a device to mitigate the deleterious effects of transmitter-generated broadband noise and inter-modulation.

SUMMARY

Described herein is a circulator-enabled signals suppressor (CENSOR) for reducing co-site interference comprising: a first circulator comprising first, second, and third ports, wherein the first port is disposed to receive an incoming signal from an antenna, wherein the incoming signal comprises a desired signal and an interference signal; a first reflective, tunable bandpass filter-bank operatively coupled to the second port, disposed to reflect a reflected signal back into the second port and also to produce a filtered signal, wherein the reflected signal comprises the desired signal and a reflected portion of the interference signal, and the filtered signal comprises a majority portion of the interference signal; and a receiver operatively coupled to the third port and disposed to receive the reflected signal.

In another embodiment, the CENSOR may be described as a broadband co-site transmission interference suppressor system comprising: an antenna; a receiver operatively coupled to the antenna; and a plurality of interference suppressors operatively coupled between the antenna and the receiver, wherein each interference suppressor is designed to operate in different sub-bands of the frequency band of the antenna, and wherein each interference suppressor comprises: (a) a circulator comprising first, second, and third ports, wherein the first port is disposed to receive an incoming signal from the antenna, wherein the incoming signal comprises a desired signal and an interference signal, and the third port is operatively coupled to the receiver, and (b) a reflective, tunable bandpass filter-bank operatively coupled to the second port, disposed to reflect a reflected signal back into the second port and to produce a filtered signal, wherein the reflected signal comprises the desired signal and a reflected portion of the interference signal, and the filtered signal comprises a majority portion of the interference signal.

In another embodiment, the CENSOR may be described as a method of suppressing co-site transmission interference comprising the following steps: (a) receiving at a first port of a three-port circulator an incoming signal comprising a desired signal and an interference signal from a co-sited transmitter; (b) directing the incoming signal from the second port into a bank of tunable bandpass filters; (c) reflecting the desired signal off of the filter-bank back into the second port; (d) filtering the desired signal out of the incoming signal and outputting the interference signal from the filter-bank; and (e) directing the reflected desired signal that exits the third port to a receiver.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
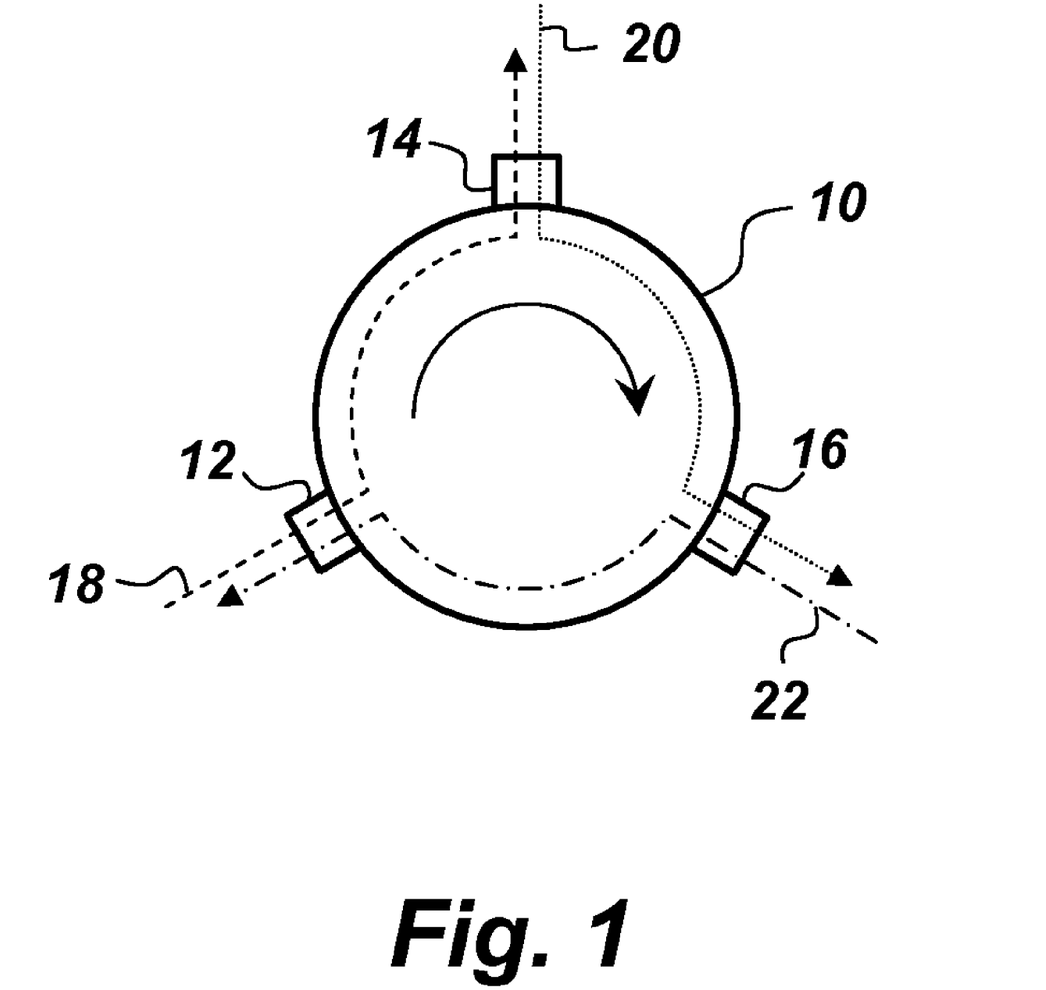
FIG. 1 is an illustration of a typical 3-port circulator.

Circulators are multi-port electrical devices that control the direction of the signal flow around their ports. FIG. 1 shows an ideal clockwise circulator 10 having first, second, and third ideal ports 12, 14, and 16 respectively. As shown in FIG. 1, a first signal 18 entering the first ideal port 12 is directed by the circulator 10 such that the entire first signal 18 exits the second ideal port 14. Likewise, a second signal 20 entering the second ideal port 14 exits from the third ideal port 16, and a third signal 22 entering the third ideal port 16 exits the circulator 10 from the first ideal port 12. The circulator is named after this "circulation" of the signal around the ports. Circulators can be clockwise or counterclockwise circulators.

In an actual circulator, as opposed to the ideal circulator 10 shown in FIG. 1, not all of the power of the incoming signal makes it out of the intended port. A portion of the incoming signal in an actual circulator may be reflected, lost, and/or even "leaked" to a non-intended port. These shortcomings are measured by the return loss, the insertion loss, and the isolation respectively. The return loss is defined as the ratio of the input power to the reflected power. The ideal circulator 10 would have a return loss of zero. A typical, real-world circulator, on the other hand, may have a return loss of approximately 15 dB or more. Regarding the insertion loss, the ideal circulator 10 would have an insertion loss of zero, but an actual circulator may have an insertion loss on the order of 0.5 dB. Regarding the isolation, the ideal circulator 10 has infinite isolation, but an actual circulator may have an isolation of at least 20 dB.

Figure 2A:
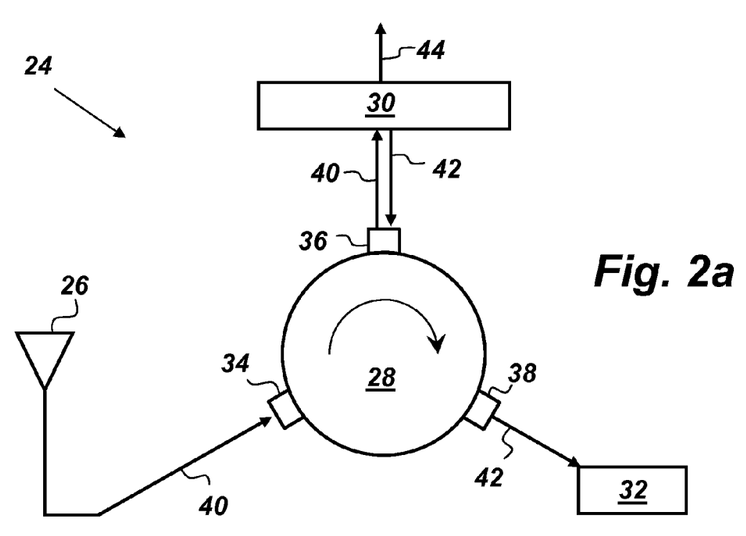
FIG. 2a shows an embodiment of the CENSOR.
Figures 2B, 2C:
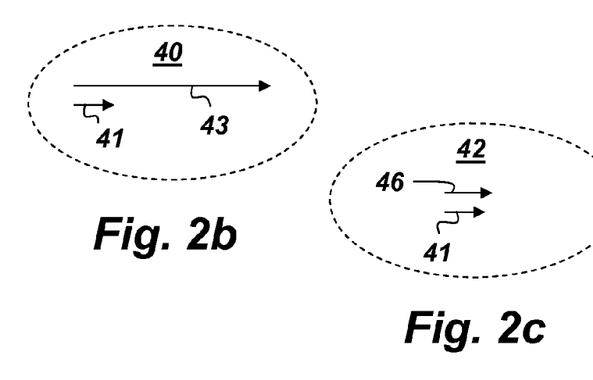
FIGS. 2b-2d depict various signals and some of their constituent parts.

FIG. 2a shows a circulator-enabled signals suppressor (CENSOR) 24. The CENSOR 24 may be used to reduce interference caused by transmitters in close proximity to a receiving antenna 26. The CENSOR 24 comprises a first circulator 28, a first reflective, tunable bandpass filter-bank 30, and a receiver 32. The first circulator 28 comprises first, second, and third ports, 34, 36, and 38 respectively. The first port 34 may be disposed to receive an incoming signal 40 from the antenna 26. As shown in FIG. 2b, the incoming signal 40 comprises a desired signal component 41 and an interference signal component 43. The interference signal 43 is typically a powerful signal caused by a high power, co-site transmitter. The interference signal 43 could comprise undesired signals from a plurality of interfering co-sited transmitters. Although the first circulator 28 is depicted in FIG. 2 as a 3-port circulator, it is to be understood that the first circulator 28 is not limited to 3-port circulator embodiments, but may be a circulator with any number of three or more desired ports.

The first filter-bank 30 may be operatively coupled to the second port 36 and disposed to reflect a reflected signal 42 back into the second port 36. As shown in FIG. 2c, the reflected signal 42 comprises the desired signal component 41 and a reflected portion 46 of the interference signal component 43. In operation, practical filters in the filter-bank 30 will reflect some of the interference signal 43. The reflected portion 46 is typically 10 to 20 dB down from the original interference signal 43 power. Because the un-reflected portion 48 of the interference signal 43 does not need to be amplified to create the canceller signal 54, the CENSOR 24 may be deemed to a passive interference canceller system.

Figure 2D:
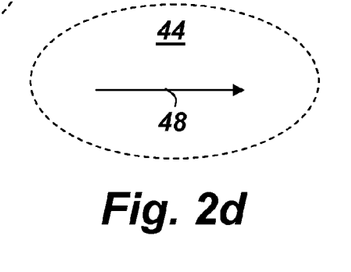

Based on previously acquired knowledge and/or measurements of the interference signal 43, the filters in the filter-bank 30 may be tuned to the interference signal 43 so that upon receiving the incoming signal 40, the first filter-bank 30 also produces a filtered signal 44. As shown in FIG. 2d, the filtered signal 44 comprises an un-reflected portion 48 of the interference signal 43. There may be conditions where the number of tunable filters in the filter-bank 30 will exceed the number of interference signals; in such conditions, filters exceeding the required number may be tuned outside of the operating band of the first circulator 28. High Q filters, or filters of high selectivity, primarily encompassing the interference signal 43, may be used in the filter-bank 30. Suitable examples of the filters in the filter-bank 30 include, but are not limited to, the following types of filters: cavity, strip line, and surface wave acoustic (SAW). In the embodiment of the CENSOR 24, shown in FIG. 2a, the receiver 32 is operatively coupled to the third port 38 and disposed to receive the reflected signal 42. In this way, the CENSOR is capable of increasing the available spectrum that can be received by decreasing the spectrum that is suppressed from the total receive spectrum due to the undesired, high-level interference signals 43.

Figure 3:
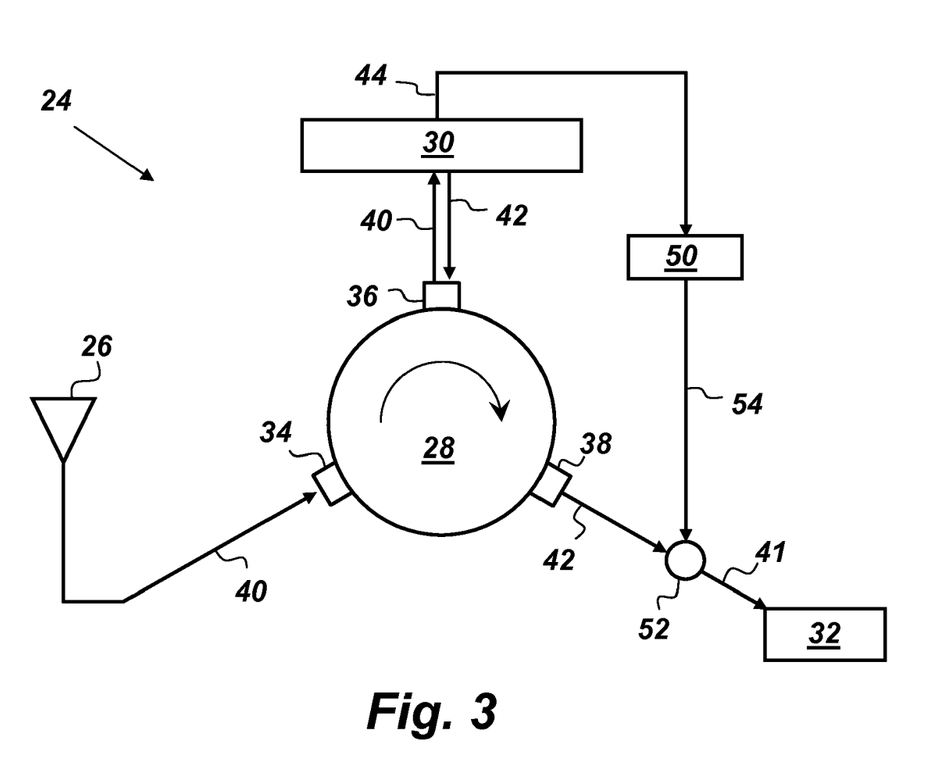
FIG. 3 shows another embodiment of the CENSOR.

FIG. 3 depicts another embodiment of the CENSOR 24 further comprising a first tunable radio frequency (RF) canceller 50 and a combiner 52. The first RF canceller 50 is disposed to transform the filtered signal 44 into an amplitude-adjusted, 180°-out-of-phase canceller signal 54. The amplitude of the canceller signal 54 is adjusted to substantially match the amplitude of the reflected portion 46 of the interference signal 43. The phase of the canceller signal 54 is adjusted to be approximately 180°-out-of-phase with the reflected portion 46 of the interference signal 43. The combiner 52 is operatively coupled between the third port 38 and the receiver 32. The combiner 52 is disposed to combine the reflected signal 42 from the third port 38 with the canceller signal 54 from the first RF canceller 50 such that the reflected portion 46 of the interference signal 43 is substantially reduced.

In some instances, due to insufficient isolation, some of the interference signal 43 may leak from the first port 34 to the third port 38. In such cases, the first RF canceller 50 may be tuned to create a canceller signal 54 that—once combined with the reflected signal—substantially cancels out the sum of the reflected portion 46 of the interference signal 43 and any residual interference signal 43 that leaks from the first port 34 to the third port 38.

Figure 4:
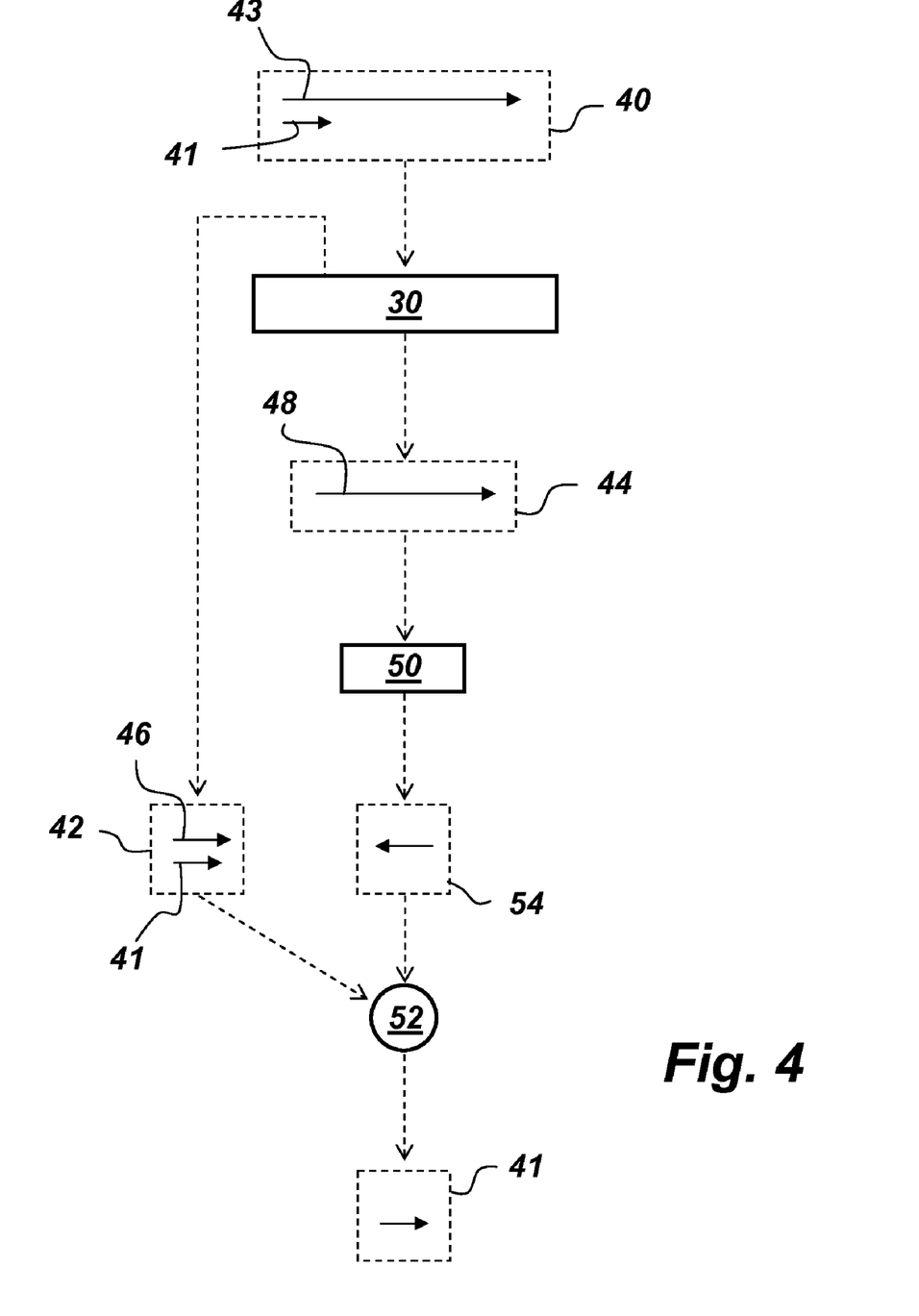
FIG. 4 is a representation of how an incoming signal is transformed by the CENSOR.

FIG. 4 is an illustration depicting how the CENSOR 24 transforms the incoming signal 40. As shown in FIG. 4, the incoming signal 40 comprises a desired signal 41 and an interference signal 43. The incoming signal 40 is directed to the filter-bank 30 via the first circulator 28, not shown. Two transformations of the incoming signal 40 occur at the filter-bank 30. In one of the transformations, the desired signal 41 and the reflected portion 46 of the interference signal 43, collectively referred to as the reflected signal 42, get reflected off of the filter-bank 30 and are then directed to the combiner 52 via the first circulator 28. The other transformation of the incoming signal 40 at the filter-bank 30 occurs when the un-reflected portion 48 of the interference signal 43 (also referred to as the filtered signal 44) is allowed to pass through the filter-bank 30 to the RF canceller 50. The amplitude and phase of the filtered signal 44 is then adjusted by the RF canceller 50 to create a canceller signal 54, which is also sent to the combiner 52. At the combiner 52, the canceller signal 54 and the reflected portion 46 of the interference signal 43 substantially cancel each other out—leaving the desired signal 41.

Figure 5:
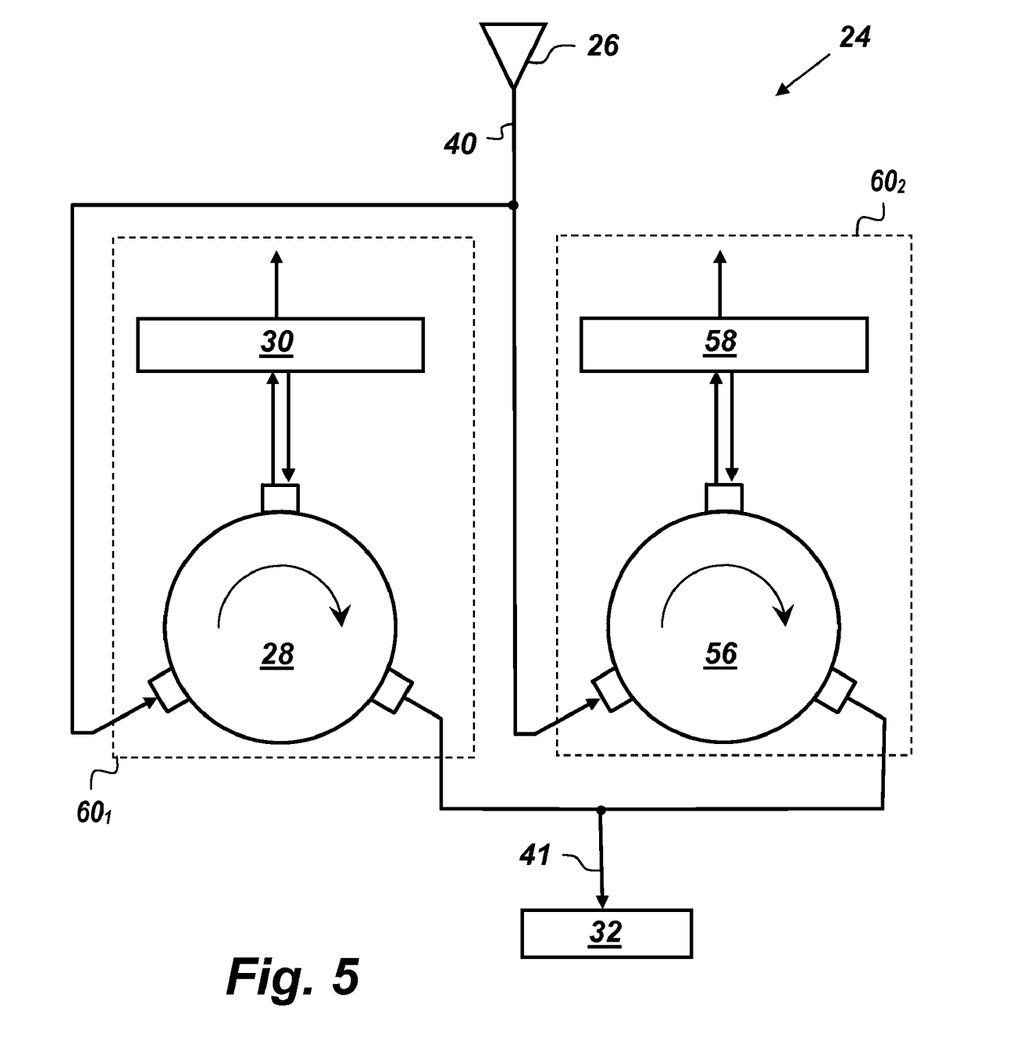
FIG. 5 is a depiction of another embodiment of the CENSOR.

FIG. 5 shows another embodiment of the CENSOR 24 comprising a second circulator 56 and a second reflective, tunable bandpass filter-bank 58. The second circulator 56 and a second filter-bank 58 are coupled together in the same manner as the first circulator 28 and the first filter-bank 30. Both the first and the second circulators 28 and 56 are disposed to receive the incoming signal 40 from the antenna 26, and the receiver 32 is disposed to receive the output of both the first and second circulators 38 and 56. Each circulator and filter-bank combination may be referred to as individual interference suppressors $60_{1-2}$. In this embodiment, interference suppressor $60_1$ is designed to receive in a different frequency band than interference suppressor $60_2$.

Figure 6:
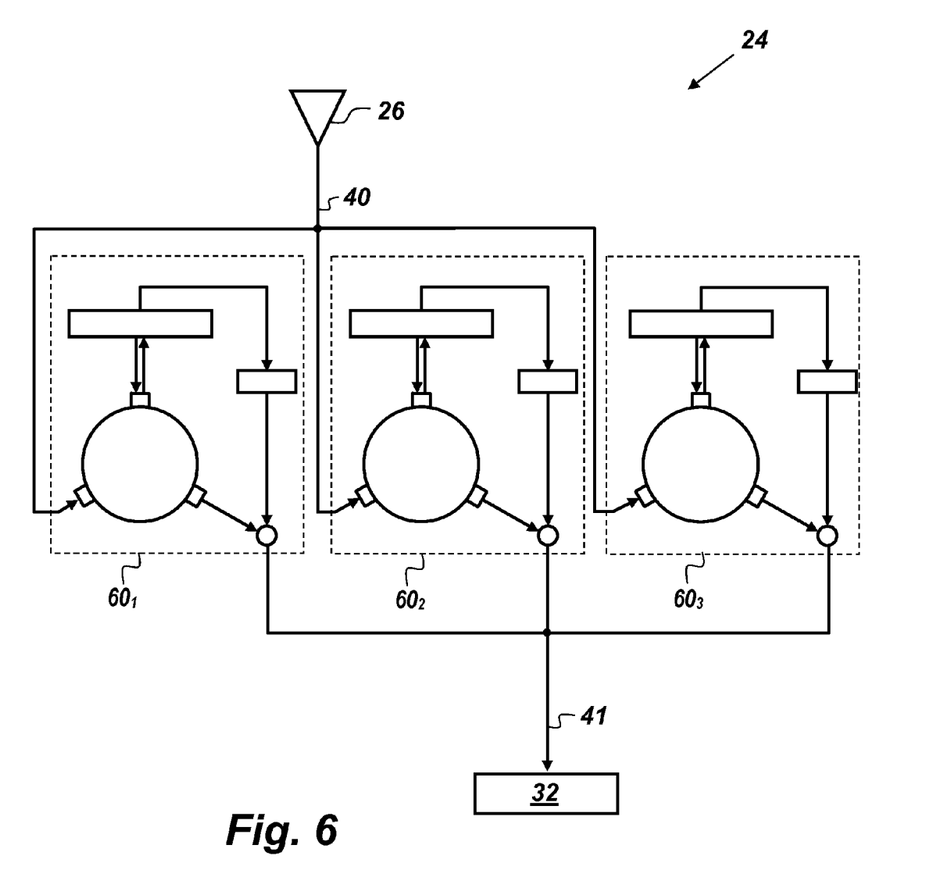
FIG. 6 is a depiction of another embodiment of the CENSOR.

FIG. 6 is a depiction of another embodiment of the CENSOR showing a parallel combination of three interference suppressors $60_{1-3}$. In this embodiment, each of the interference suppressors $60_{1-3}$ comprises a circulator 28, a filter-bank 30, a RF canceller 50 and a combiner 52 coupled together in the manner described above in association with FIG. 3. In this embodiment, each interference suppressor $60_{1-3}$ is designed to receive signals in a different frequency band than the other interference suppressors $60_{1-3}$. The operating frequency bands of the interference suppressors $60_{1-3}$ form contiguous sub-bands that together comprise the total frequency band of the antenna 26.

Figure 7:
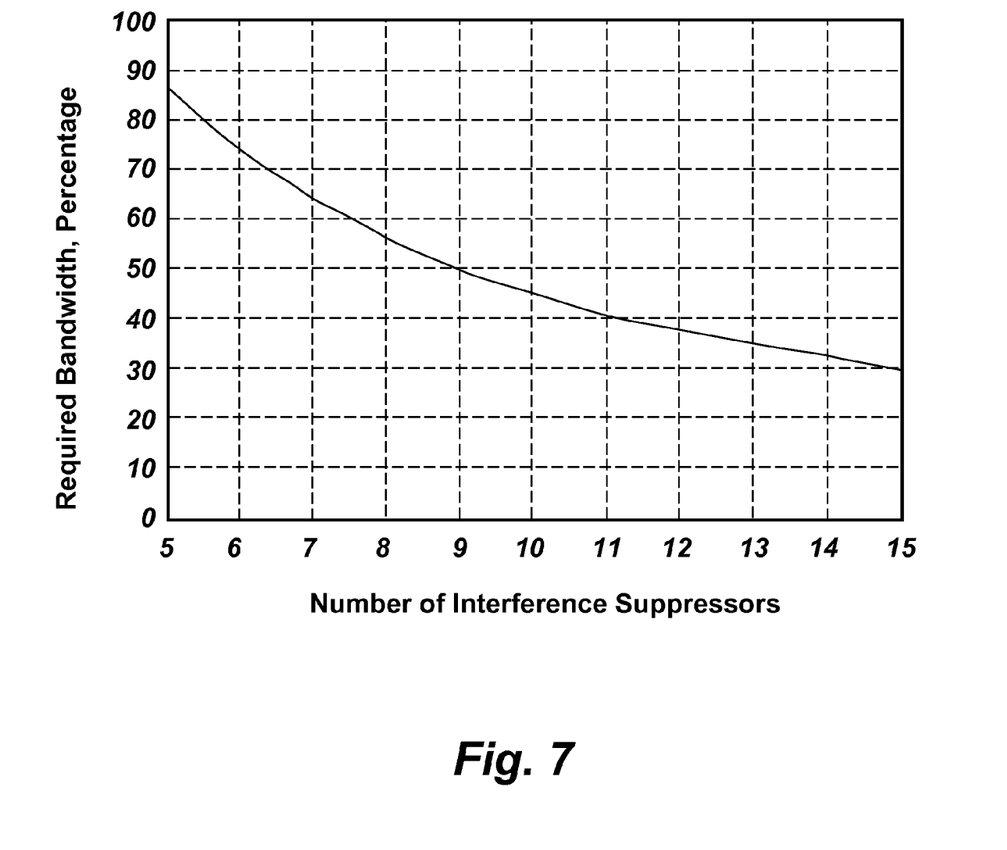
FIG. 7 is a graph showing the estimated number of interference suppressor units required for a given bandwidth.

FIG. 7 is a graph showing the estimated number of interference suppressors 60 required to cover a two-decade receive spectrum. An example of two decades of spectrum is 30 MHz to 3 GHz. There can only be an integer number of interference suppressors 60. If there are four interference suppressors 60, each interference suppressor 60 would have to have 86% bandwidth to cover the 30 MHz to 3 GHz spectrum. Similarly, eight interference suppressors 60 would cover the 30 MHz to 3 GHz spectrum with each interference suppressor 60 having a bandwidth of 56%. It would take fifteen interference suppressors 60 with a bandwidth of 30% to cover the 30 MHz to 3 GHz spectrum. Each of the interference suppressors 60 may be designed operate in one of a plurality of contiguous sub-bands, one interference suppressor 60 per sub-band, wherein the sub-bands together comprise the total frequency band of the antenna 26. The number of interference suppressors 60 is a function of the required percentage bandwidth for a given circulator 28. This analysis assumes that each interference suppressor 60 has the same percentage bandwidth. In an actual design the percentage bandwidth for each interference suppressor 60 will probably be different. Also, as frequency increases the ability to provide greater percentage bandwidth for a given interference suppressor 60 improves.

Figure 8:
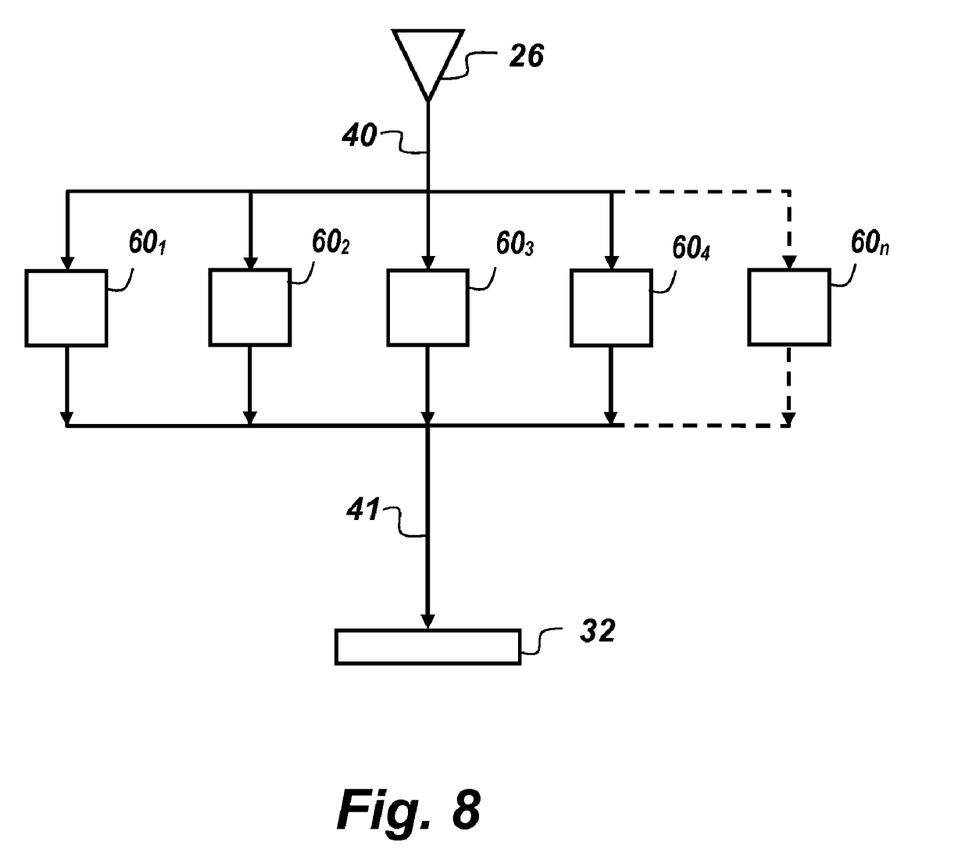
FIG. 8 illustrates an embodiment of the CENSOR having n interference suppressor units.

FIG. 8 shows an embodiment of the CENSOR 24 comprising n interference suppressors $60_{1-n}$. The CENSOR 24 is not limited to any specific number of interference suppressors 60, but may have any desired number of interference suppressors 60 depending on design requirements.

From the above description of the CENSOR 24, it is manifest that various techniques may be used for implementing the concepts of the CENSOR 24 without departing from its scope. The described embodiments are to be considered in all respects as illustrative and not restrictive. It should also be understood that CENSOR 24 is not limited to the particular embodiments described herein, but is capable of many embodiments without departing from the scope of the claims.

We claim:

1. An apparatus comprising:
    a first circulator comprising first, second, and third ports, wherein the first port is disposed to receive an incoming signal from an antenna, wherein the incoming signal comprises a desired signal and an interference signal;
    a first reflective, tunable bandpass filter-bank operatively coupled to the second port, disposed to reflect a reflected signal back into the second port and to produce a filtered signal, wherein the reflected signal comprises the desired signal and a reflected portion of the interference signal, and the filtered signal comprises an un-reflected portion of the interference signal;
    a first tunable radio frequency (RF) canceller disposed to adjust the amplitude and phase of the filtered signal to create a canceller signal; and
    a receiver operatively coupled to the third port and disposed to receive the reflected signal.

2. The apparatus of claim 1, further comprising a combiner operatively coupled between the third port and the receiver and disposed to combine the reflected signal from the third port with the canceller signal from the first RF canceller such that the reflected portion of the interference signal is substantially reduced.

3. The apparatus of claim 2, wherein the first RF canceller is tuned such that the canceller signal substantially cancels out the sum of the reflected portion of the interference signal and any residual interference signal that leaks from the first port to the third port.

4. The apparatus of claim 2, wherein each of the filters in the first filter-bank are cavity filters.

5. The apparatus of claim 2, wherein each of the filters in the first filter-bank are strip line filters.

6. The apparatus of claim 2, wherein each of the filters in the first filter-bank are surface wave acoustic (SAW) filters.

7. The apparatus of claim 2, wherein the filters in the first filter-bank are high selectivity filters.

8. The apparatus of claim 2, wherein the interference signal comprises signals from a plurality of interfering co-sited transmitters.

9. The apparatus of claim 2, further comprising:
    a second circulator;
    a second reflective, tunable bandpass filter-bank;
    a second RF canceller;
    a second combiner; and
    wherein the second circulator, the second filter-bank, the second RF canceller, and the second combiner are all coupled together in the same manner as the first circulator, the first filter-bank, the first RF canceller, and the first combiner, but wherein the second circulator and the second filter-bank are designed to receive signals in a different frequency band than the first circulator and the first filter-bank.

10. The apparatus of claim 9, wherein the operating frequency bands of the first and second circulators and filter-banks are contiguous sub-bands that together comprise the total frequency band of the antenna.

11. The apparatus of claim 1, further comprising a second circulator and a second reflective, tunable bandpass filter-bank coupled together in the same manner as the first circulator and first filter-bank, but wherein the second circulator and the second filter-bank are designed to receive signals in a different frequency band than the first circulator and the first filter-bank.

12. A broadband co-site transmission interference suppressor system comprising:
    an antenna;
    a receiver operatively coupled to the antenna; and
    a plurality of interference suppressors operatively coupled between the antenna and the receiver, wherein each interference suppressor is designed to operate in different sub-bands of the frequency band of the antenna, and wherein each interference suppressor comprises:
    a) a circulator comprising first, second, and third ports, wherein the first port is disposed to receive an incoming signal from the antenna, wherein the incoming signal comprises a desired signal and an interference signal, and the third port is operatively coupled to the receiver,
    b) a reflective, tunable bandpass filter-bank operatively coupled to the second port, disposed to reflect a reflected signal back into the second port and to produce a filtered signal, wherein the reflected signal comprises the desired signal and a reflected portion of the interference signal, and the filtered signal comprises an un-reflected portion of the interference signal;
    c) a tunable radio frequency (RF) canceller disposed to adjust the amplitude and phase of the filtered signal to create a canceller signal; and
    d) a combiner operatively coupled between the third port and the receiver and disposed to combine the reflected signal from the third port with the canceller signal from the RF canceller such that the reflected portion of the interference signal is substantially reduced before the reflected signal reaches the receiver.

13. The system of claim 12, wherein, in each interference suppressor, the first RF canceller is tuned such that the corresponding canceller signal substantially cancels out the sum of the reflected portion of the interference signal and any residual interference signal that leaks from the first port to the third port.

14. The system of claim 12, wherein each of the interference suppressors is designed operate in one of a plurality of contiguous sub-bands, one interference suppressor per sub-band, wherein the sub-bands together comprise the total frequency band of the antenna.

15. The system of claim 14, wherein each filter in the various filter-banks is a high selectivity filter.

16. A method of suppressing co-site transmission interference comprising the following steps:
    a) receiving at a first port of a three-port circulator an incoming signal comprising a desired signal and an interference signal from a co-sited transmitter;
    b) directing the incoming signal from the second port into a bank of tunable bandpass filters;

c) reflecting the desired signal and a portion of the interference signal off of the filter-bank back into the second port;

d) filtering the desired signal out of the incoming signal and outputting the interference signal from the filter-bank;

e) directing the outputted interference signal from the filter-bank into a radio frequency (RF) canceller;

f) adjusting the phase and amplitude of the outputted interference signal to create a canceller signal; and g) directing the reflected desired signal and the portion of the interference signal that exits the third port to a receiver.

17. The method of claim 16, further comprising the step of combining the canceller signal with the reflected portion of the interference signal from the third port such that the reflected portion of the interference signal is substantially canceled out.

* * * * *